(12) United States Patent
Kim et al.

(10) Patent No.: US 12,020,411 B2
(45) Date of Patent: Jun. 25, 2024

(54) REMAPPING FOR MIXED DYNAMIC RANGE CONTENT

(71) Applicant: Google LLC, Mountain View, CA (US)

(72) Inventors: Hyunchul Kim, San Jose, CA (US); Wonjae Choi, San Jose, CA (US); Sang Young Youn, Cupertino, CA (US); Sun-il Chang, San Jose, CA (US)

(73) Assignee: Google LLC, Mountain View, CA (US)

( * ) Notice: Subject to any disclaimer, the term of this patent is extended or adjusted under 35 U.S.C. 154(b) by 564 days.

(21) Appl. No.: 17/051,822

(22) PCT Filed: Dec. 4, 2019

(86) PCT No.: PCT/US2019/064444
§ 371 (c)(1),
(2) Date: Oct. 30, 2020

(87) PCT Pub. No.: WO2021/112838
PCT Pub. Date: Jun. 10, 2021

(65) Prior Publication Data
US 2023/0196524 A1 Jun. 22, 2023

(51) Int. Cl.
*G06T 5/00* (2006.01)
*G06T 5/92* (2024.01)

(52) U.S. Cl.
CPC ...... *G06T 5/92* (2024.01); *G06T 2207/20208* (2013.01)

(58) Field of Classification Search
CPC .............. G06T 5/009; G06T 2207/20208
See application file for complete search history.

(56) References Cited

U.S. PATENT DOCUMENTS 10,148,907 B1 12/2018 Wu et al.
2016/0368346 A1 12/2016 Nishikawa et al.
(Continued)

FOREIGN PATENT DOCUMENTS

CN 102257531 11/2011
CN 105794216 7/2016
(Continued)

OTHER PUBLICATIONS

International Preliminary Report on Patentability in International Appln. No. PCT/US2019/064444, dated Jun. 16, 2022, 12 pages.
(Continued)

*Primary Examiner* — Phuoc Tran
(74) *Attorney, Agent, or Firm* — Fish & Richardson P.C.

(57) ABSTRACT

Methods, systems, and apparatus, including computer programs encoded on a computer storage medium, for remapping for mixed dynamic range content. In one aspect, a method for remapping for mixed dynamic range content, the method includes obtaining an image to be displayed that includes both first dynamic range content and second dynamic range content, determining that the image includes first dynamic range content at a first pixel, determining a first remapped value for the first pixel based on a lookup table for first dynamic range content and an initial value for the first pixel, providing the first remapped value for the first pixel for display, determining that the image includes second dynamic range content at a second pixel, determining a second remapped value for the second pixel based on a second initial value for the second pixel, and providing the second remapped value for the second pixel for display.

12 Claims, 11 Drawing Sheets

(56) References Cited

U.S. PATENT DOCUMENTS

2017/0103729 A1    4/2017  Huang et al.
2018/0330674 A1*  11/2018  Baar .................... H05B 45/20
2019/0035063 A1*   1/2019  Park .................... G09G 3/2092

FOREIGN PATENT DOCUMENTS

| CN | 106488141 | 3/2017 |
|---|---|---|
| CN | 108521859 | 9/2018 |
| CN | 110192223 | 8/2019 |
| EP | 3537717 | 9/2019 |
| WO | WO 2017/196727 | 11/2017 |

OTHER PUBLICATIONS

PCT International Search Report and Written Opinion in International Application No. PCT/US2019064444, dated Aug. 3, 2020, 19 pages.

Sole et al., "Showcase of the regional nesting SEI message," Joint Collaborative team on video coding, Jan. 2017, 13 pages.

Boitard et al., "High dynamic range versus standard dynamic range compression efficiency." 2016 Digital Media Industry & Academic Forum (DMIAF), IEEE, Jul. 2016, 5 pages.

Li et al., "High dynamic range scenes reproduction based on hybrid mapping." Optics and Precision Engineering 26.12, Dec. 2018, 3051-3059 (with English abstract).

Office Action in Chinese Appln. No. 201980101269.X, mailed on Sep. 23, 2023, 24 pages (with English translation).

Xiaoke, "A Study on Tone Mapping for High Dynamic Rang Images and Its Application to Low Dynamic Range Displays and Backlight Scaling" Thesis for the degree of Master in Electronics and Communication Engineering, University of Xidian, Dec. 2014, 104 pages (with English abstract).

Notice of Allowance in Chinese Appln. No. 201980101269.X, mailed on Mar. 25, 2024, 6 pages (with English translation).

* cited by examiner

REMAPPING FOR MIXED DYNAMIC RANGE CONTENT

CROSS-REFERENCE TO RELATED APPLICATION

This application is a National Stage Application under 35 U.S.C. § 371 and claims the benefit of International Application No. PCT/US2019/064444, filed Dec. 4, 2019. The disclosure of the foregoing application is hereby incorporated by reference in its entirety.

BACKGROUND

Image content may be encoded in different dynamic ranges. For example, a first video may be encoded as high dynamic range (HDR) content and a second video may be encoded as standard dynamic range (SDR) content. HDR video may provide for brighter whites and deeper blacks than SDR video. Dynamic range may refer to a ratio between a maximum and minimum luminance of a pixel.

SUMMARY

This specification describes techniques, methods, systems, and other mechanisms for remapping for mixed dynamic range content. Generally, image content only includes content in a single dynamic range. For example, an image may include only HDR content and no SDR content. In another example, an image may include no HDR content and only SDR content.

However, it may be advantageous to provide an image that includes mixed dynamic range content. For example, an image with mixed dynamic range content to be shown on a display may include HDR content for a portion of the display that will show a video encoded with HDR and include SDR content for a remaining portion of the display that will show a graphical user interface that is represented as SDR content.

A problem with mixed dynamic range content may be that different dynamic ranges are encoded differently so may need to be decoded differently. For example, SDR content may be encoded with a gamma curve that is different than a gamma curve that is used to encode HDR content. Accordingly, gamma decoding for content of the different ranges may differ based on the range of the content. Remapping may include both gamma encoding and gamma decoding. For example, HDR content may need to be decoded with a gamma curve for HDR to display accurately and SDR content may need to be decoded with a gamma curve for SDR to display accurately.

Decoding content in a dynamic range based on decoding for another dynamic range may result in an inaccurate display. For example, decoding HDR content as SDR content may result in the content displaying darker than the content should be displayed, and decoding SDR content as HDR content may result in the content displaying brighter than the content should be displayed To accurately gamma decode an image with mixed dynamic range content, a system may dynamically determine whether to decode particular content as a first dynamic range or as a second dynamic range. For example, a system may determine whether to decode a first pixel as SDR content or as HDR content, and also determine whether to decode a second pixel in the image as SDR content or as HDR content. Accordingly, the system may enable details of the HDR content to avoid being lost when displayed as SDR content while also accurately displaying SDR content simultaneously with the HDR content on the same display.

In general, one innovative aspect of the subject matter described in this specification can be embodied in a method that includes the actions of obtaining an image to be displayed that includes both first dynamic range content and second dynamic range content, determining that the image includes first dynamic range content at a first pixel, in response to determining that the image includes first dynamic range content at a first pixel, determining a first remapped value for the first pixel based on a lookup table for first dynamic range content and an initial value for the first pixel, providing the first remapped value for the first pixel for display determining that the image includes second dynamic range content at a second pixel, in response to determining that the image includes second dynamic range content at a second pixel, determining a second remapped value for the second pixel based on a second initial value for the second pixel, and providing the second remapped value for the second pixel for display.

Other embodiments of this aspect include corresponding circuitry, computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

These and other embodiments can each optionally include one or more of the following features. In some aspects, determining a first remapped value for the first pixel based on a lookup table for first dynamic range content and an initial value for the first pixel includes determining a remapped value for the first pixel based on a lookup table for first dynamic range content.

In certain aspects, determining a second remapped value for the second pixel based on a second initial value for the second pixel includes determining a second remapped value for the second pixel based on a lookup table for second dynamic range content. In some implementations, determining a second remapped value for the second pixel based on a second initial value for the second pixel includes determining a second remapped value for the second pixel based on both the lookup table for the first dynamic range content and a first dynamic range to second dynamic range conversion factor.

In some aspects, determining a second remapped value for the second pixel based on both the lookup table for the first dynamic range content and a first dynamic range to second dynamic range conversion factor includes determining an intermediate remapped value for the second pixel based on the lookup table for the first dynamic range content and determining the second remapped value based on the intermediate remapped value and the first dynamic range to second dynamic range conversion factor. In certain aspects, determining a second remapped value for the second pixel based on a second initial value for the second pixel includes determining an intermediate remapped value for the second pixel based on a first dynamic range to second dynamic range conversion and determining the second remapped value based on the intermediate remapped value and the lookup table for the first dynamic range content.

In some implementations, determining that the image includes first dynamic range content at a first pixel includes determining that metadata of the image indicates that a location of the first pixel includes first dynamic range content. In certain aspects, actions include obtaining a second image that includes second dynamic range content and does not include first dynamic range content, determining that the image includes second dynamic range content and does not include first dynamic range content, and in response to determining that the image includes second dynamic range content and does not include first dynamic range content, selecting a second first dynamic range to second dynamic range conversion factor. In some aspects, the first dynamic range content includes High Dynamic Range (HDR) content and the second dynamic range content includes Standard Dynamic Range (SDR) content.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
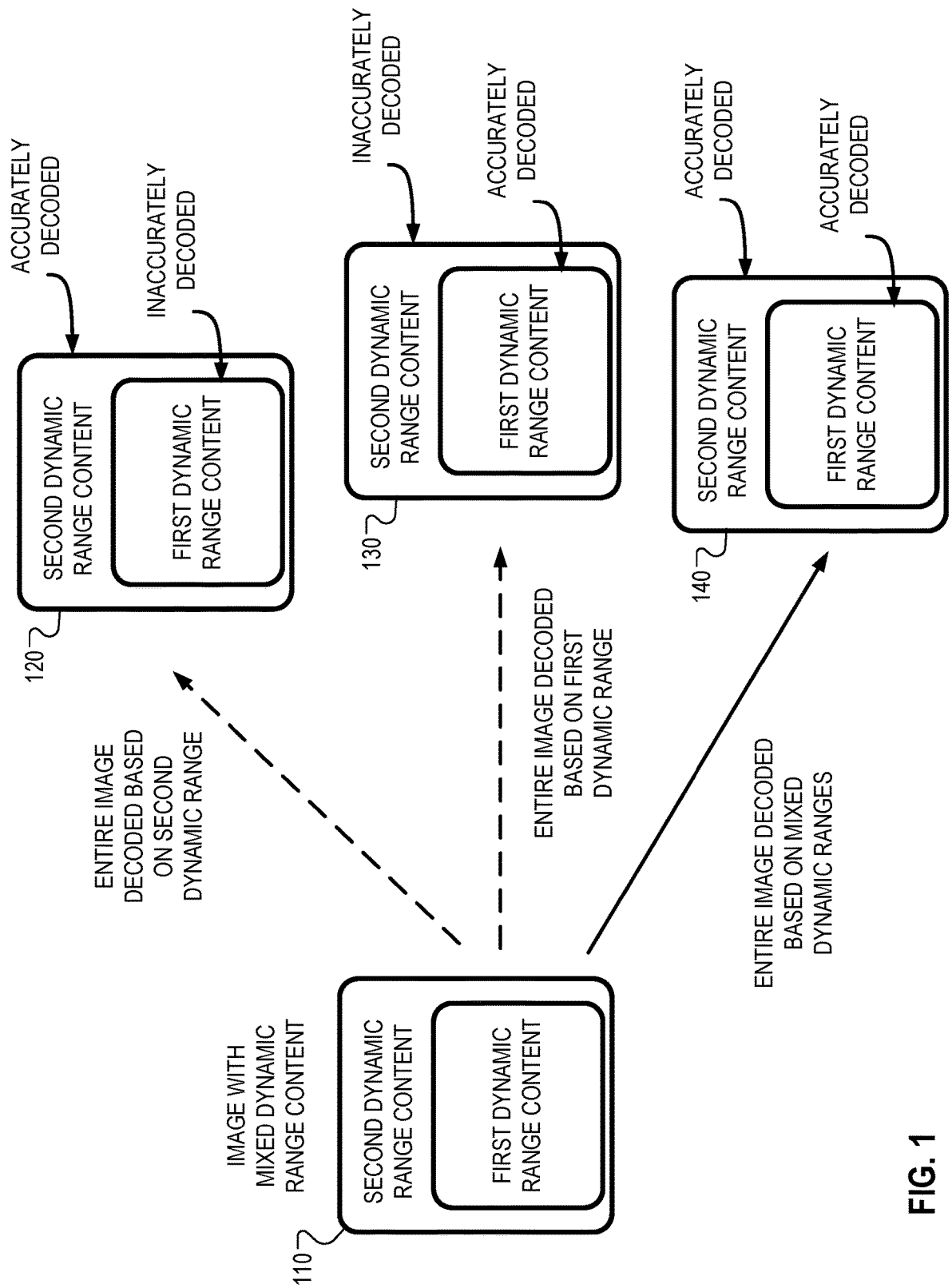
FIG. 1 is a block diagram of an example image with mixed dynamic range content being displayed based on different remappings.

FIG. 1 is a block diagram of an example image 110 with mixed dynamic range content being displayed based on different remappings. The image 110 includes an area of first dynamic range content that is surrounded by an area with second dynamic range content. For example, the first dynamic content may be from HDR video to be shown on a portion of a display and the second dynamic content may be for SDR representations of a graphical user interface for a device that includes the display, where the SDR representations are to be shown on remaining portions of the display.

First, the entire image 110 may be decoded based on a second dynamic range which results in a second image 120. For example, the entire image 110 may be decoded as SDR content. The second image 120 may accurately display the second dynamic range content but inaccurately display the first dynamic range content. For example, content from the SDR representations of the graphical user interface may be accurately displayed but content from the HDR video may be displayed darker than it should be displayed when correctly decoded as HDR content.

Second, the entire image 110 may be decoded based on a first dynamic range which results in a third image 130. For example, the entire image 110 may be decoded as HDR content. The third image 130 may accurately display the first dynamic range content but inaccurately display the second dynamic range content. For example, content from the HDR video may be accurately displayed but SDR representations of the graphical user interface may be inaccurately displayed as brighter than it should be displayed when correctly decoded as SDR content.

Third, the entire image 110 may be decoded based on mixed dynamic ranges which results in a fourth image 140. For example, the pixels of the image that represent HDR content may be decoded as HDR content and the pixels of the image that represent SDR content may be decoded as SDR content. The fourth image 140 may accurately display both the first dynamic range content and the second dynamic range content. For example, content from the HDR video may be accurately displayed and SDR representations of the graphical user interface may be accurately displayed.

Figure 2A:
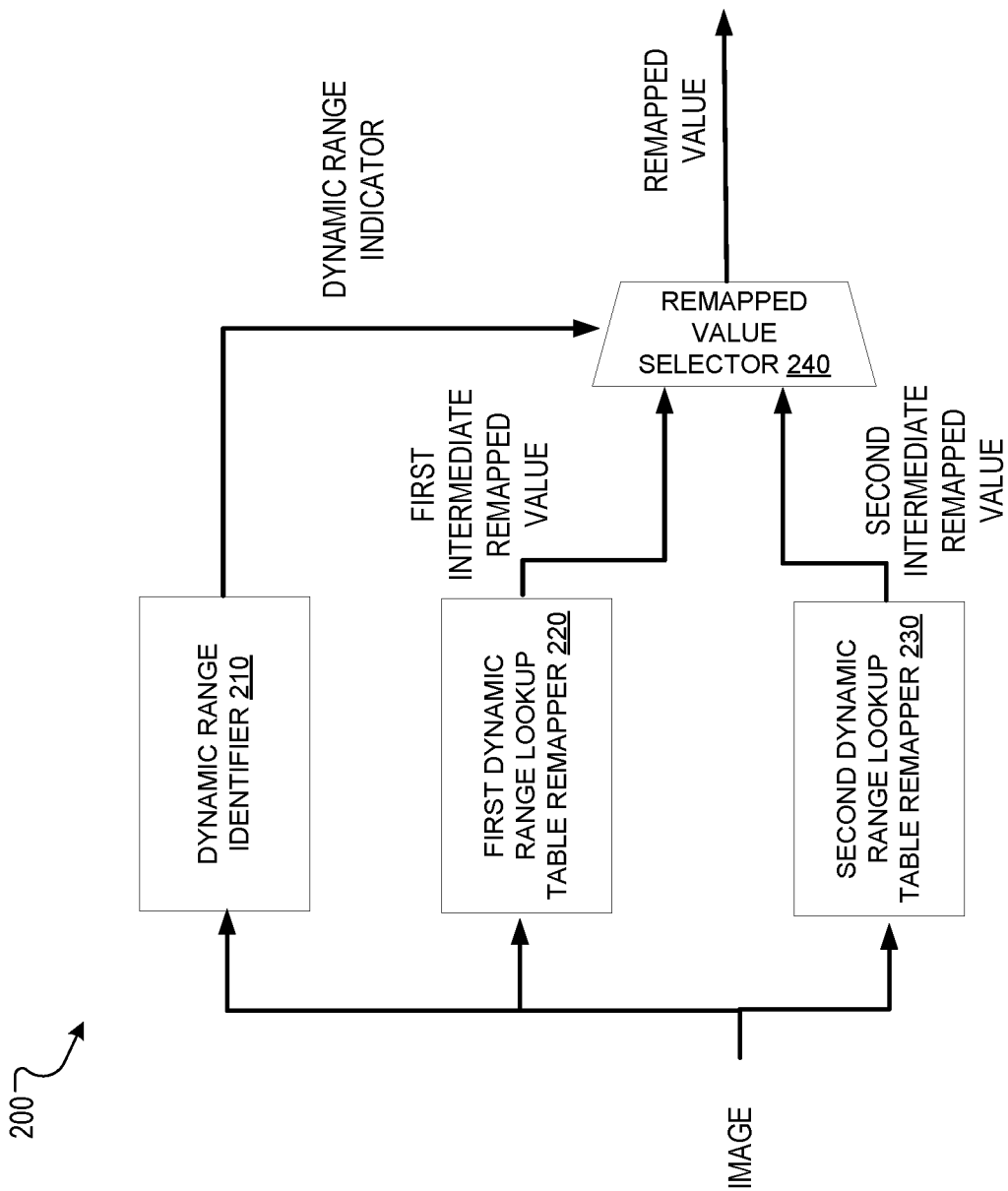
FIGS. 2A-2C are block diagrams of an example system that remaps mixed dynamic range using different lookup tables for dynamic ranges.
Figure 2B:
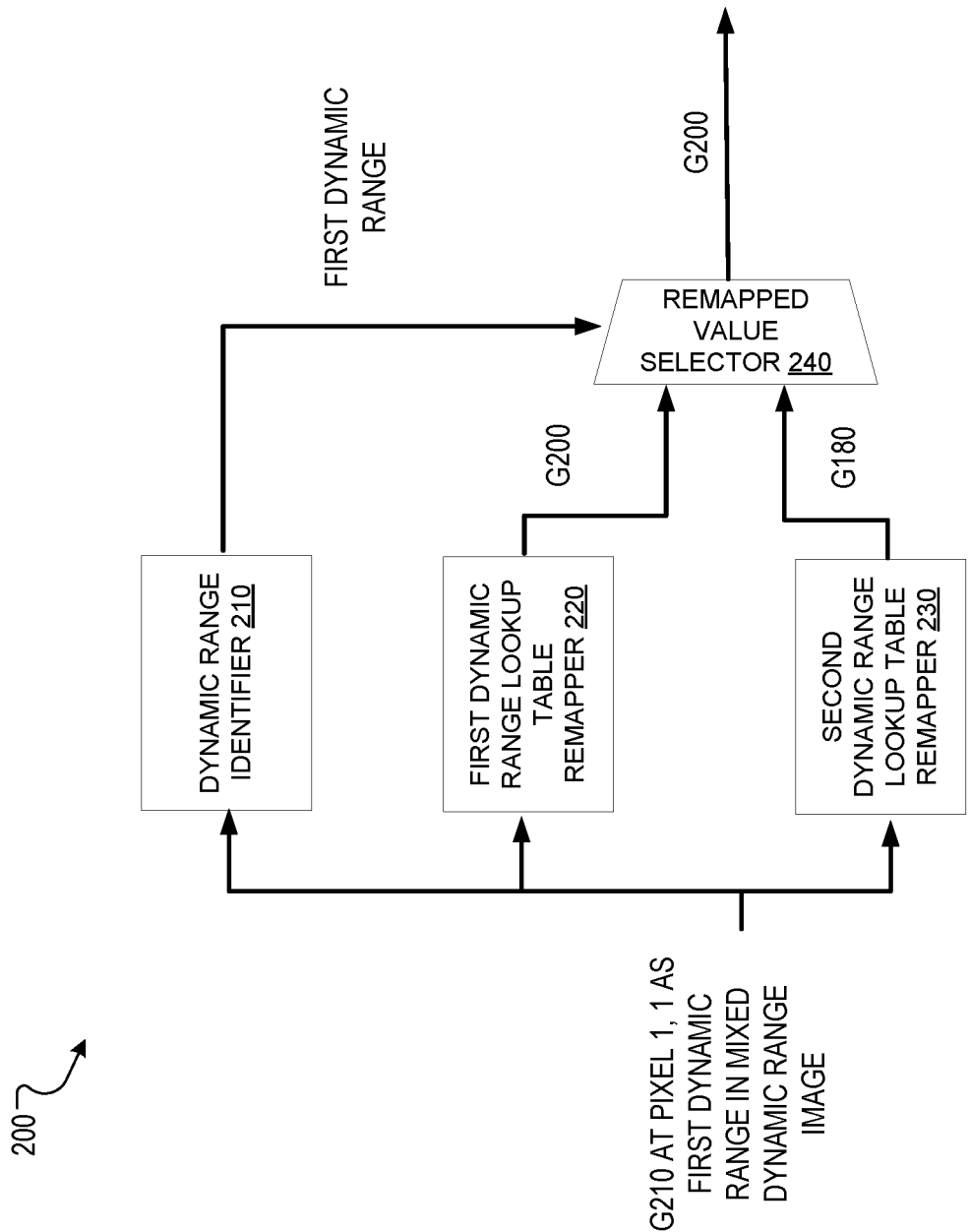
Figure 2C:
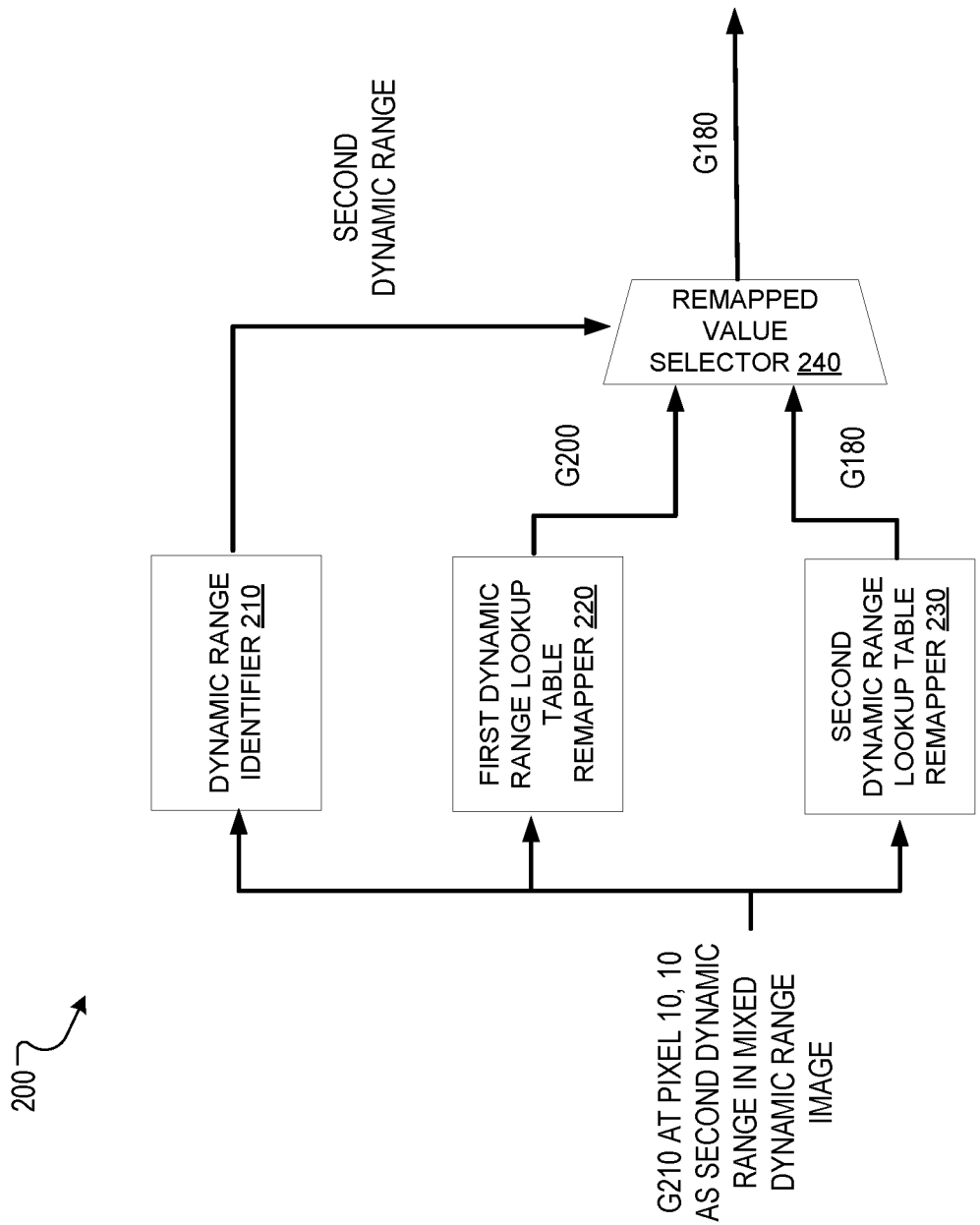

FIGS. 2A-2C are block diagrams of an example system 200 that remaps mixed dynamic range using different lookup tables for dynamic ranges. The system 200 includes a dynamic range identifier 210, a first dynamic range lookup table mapper 220, a second dynamic range lookup table remapper 230, and a remapped value selector 240.

The dynamic range identifier 210 may obtain an image and determine which pixels in the image include first dynamic range content and which pixels in the image include second dynamic range content. For example, the dynamic range identifier 210 may determine that a first pixel at a location of 1, 1 in the image includes HDR content and a second pixel at a location of 10, 10 in the image includes SDR content.

In some implementations, the dynamic range identifier 210 may determine which pixels in the image include first dynamic range content and which pixels in the image include second dynamic range content based on metadata in a header of the image. For example, the identifier 210 may determine that the pixel at 1, 1 includes HDR content based on analyzing a header of the image that stores metadata that specifies that the pixel at 1, 1 includes HDR content and the pixel at 10, 10 includes SDR content.

Based on the determinations, the dynamic range identifier 210 may then output a dynamic range indicator that indicates which type of dynamic range content is included in each pixel. For example, the dynamic range identifier 210 may output a value of "0" for a first pixel at a location of 1, 1 that indicates that the first pixel includes first dynamic range content and output a value of "1" for a second pixel at a location of 10, 10 that indicates that the second pixel includes second dynamic range content.

The first dynamic range lookup table remapper 220 remaps an input value from the image to a first intermediate remapped value based on a first dynamic range lookup table. For example, the first dynamic range lookup table remapper 220 may receive, for a pixel at a location of 1, 1 an input value of G210 that represents a gamma value of two hundred ten and remaps the input value to an first intermediate remapped value of G200 that represents a gamma value of two hundred. The first dynamic range lookup table may include input values and paired corresponding output values. For example, the first dynamic range lookup table may include an entry with an input value of G210 and a paired first intermediate remapped value of G200. The first dynamic range lookup table may include entries for each input value of integers between zero and two hundred fifty five, where each entry also includes a corresponding paired first intermediate remapped value.

The second dynamic range lookup table remapper 230 remaps an input value from the image to a second intermediate remapped value based on a second dynamic range lookup table. For example, the second dynamic range lookup table remapper 230 may receive for a pixel at a location of 1, 1 an input value of G210 that represents a gamma value of two hundred ten and remaps the input value to a second intermediate remapped value of G180 that represents a gamma value of one hundred eighty. The second dynamic range lookup table may include a pairs of input values and corresponding output values. For example, the second dynamic range lookup table may include an entry with an input value of G210 and a paired second intermediate remapped value of G180. The second dynamic range lookup table may include entries for each input value of integers between zero and two hundred fifty five, where each entry also includes a corresponding output value.

The remapped value selector 240 may receive the dynamic range indicator, the first intermediate remapped value, and the second intermediate remapped value, and select one of the intermediate remapped values as the remapped value to display based on the dynamic range indicator, the first intermediate remapped value, and the second intermediate remapped value. For example as shown in FIG. 2B, the remapped value selector 240 may receive, for a pixel at location 1, 1, an indication that content in the pixel is first dynamic range content from the dynamic range identifier 210, a first intermediate remapped value of G200 from the first dynamic range lookup table remapper 220, and a second intermediate remapped value of G180 from the second dynamic range lookup table remapper 230, and select the first intermediate remapped value of G200 as the remapped value to display as the content in the pixel is indicated as first dynamic range content.

In another example, as shown in FIG. 2C, the remapped value selector 240 may receive, for a pixel at location 10, 10, an indication that content in the pixel is second dynamic range content, a first intermediate remapped value of G200, and a second intermediate remapped value of G180, and select the second intermediate remapped value of G180 as the remapped value to display instead of the first intermediate remapped value as the content in the pixel is indicated as second dynamic range content.

The operations described above for the dynamic range identifier 210, the first dynamic range lookup table mapper 220, the second dynamic range lookup table remapper 230, and the remapped value selector 240 may be performed for each pixel in the image. For example, the operations described above for the dynamic range identifier 210, the first dynamic range lookup table mapper 220, the second dynamic range lookup table remapper 230, and the remapped value selector 240 may be performed sequentially first for a pixel at location 0, 0, then a pixel at location 0, 1, then a pixel at location 0, 2, etc. until values specified for pixels in the image are remapped. In another example, the operations described above for the dynamic range identifier 210, the first dynamic range lookup table mapper 220, the second dynamic range lookup table remapper 230, and the remapped value selector 240 may be performed in parallel for a pixel at location 0, 0, a pixel at location 0, 1, a pixel at location 0, 2, etc. for all locations of pixels in the image.

The remapped value output from the system 200 may then be provided to driver integrated circuit that is configured to receive remapped values and provide voltage to pixels in a display. For example, the remapped value of G200 may result in a voltage of 2.5 volts being provided to a pixel in the display panel and remapped value of G180 may result in a voltage of 2.1 volts being provided to a pixel in the display panel. The driver integrated circuit may receive other control factors that affect the final voltage output based on a remapped value, such control factors including display brightness control, display uniformity calibration, color calibration, and pattern loading effect control.

Figure 3A:
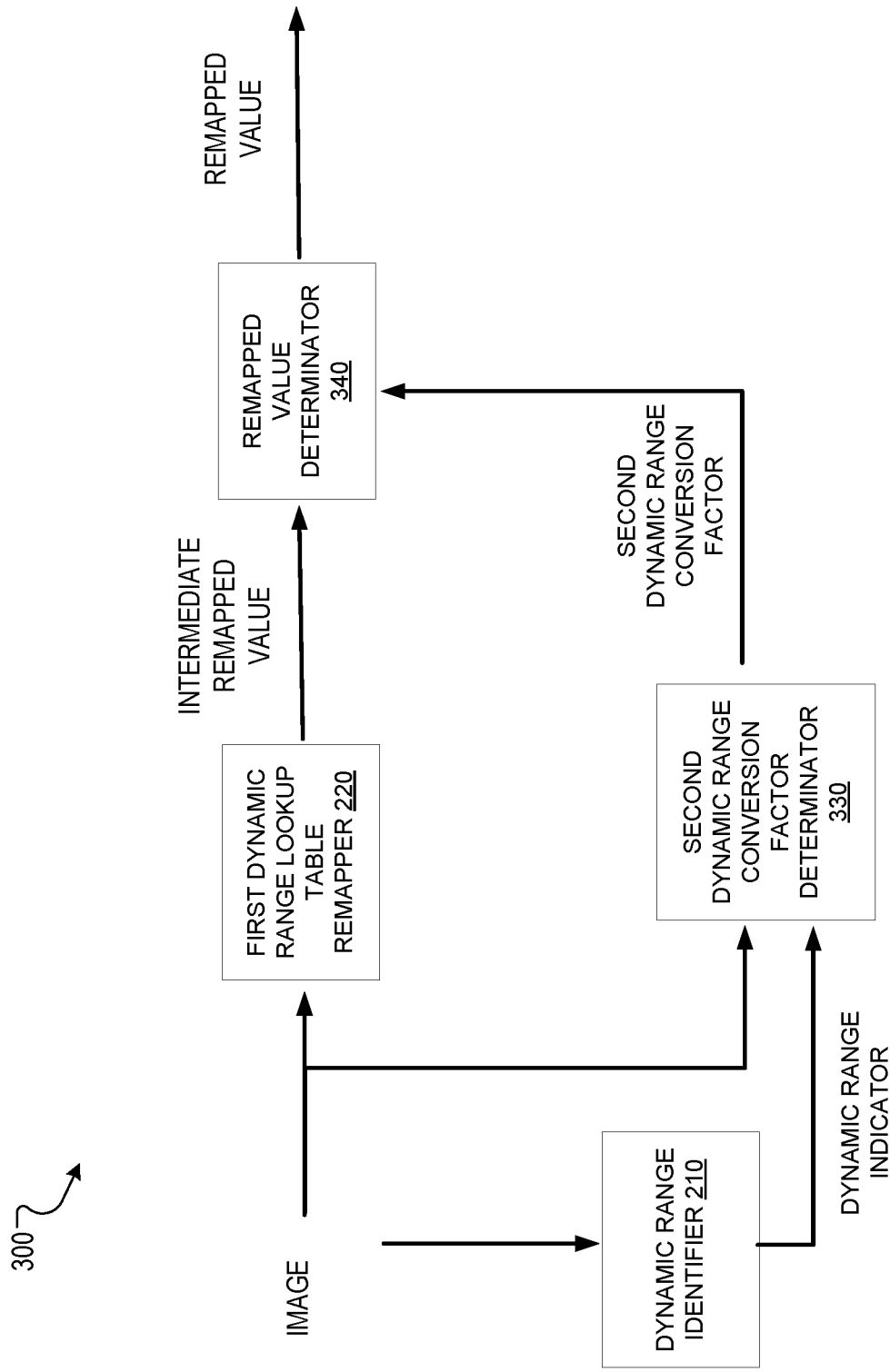
FIGS. 3A-3C are block diagrams of an example system that remaps mixed dynamic range with a dynamic range conversion factor applied to an output from a lookup table.
Figure 3B:
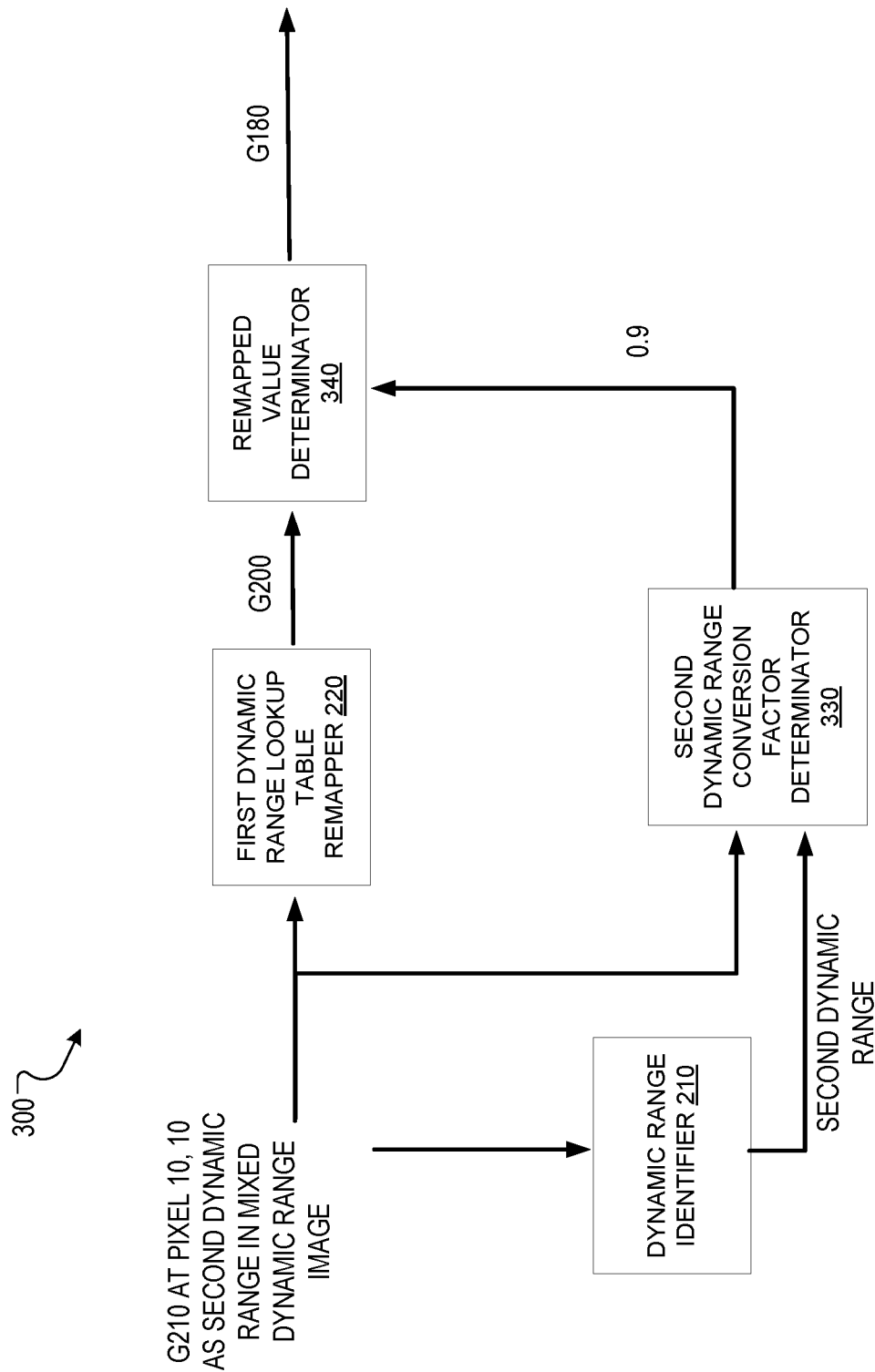
Figure 3C:
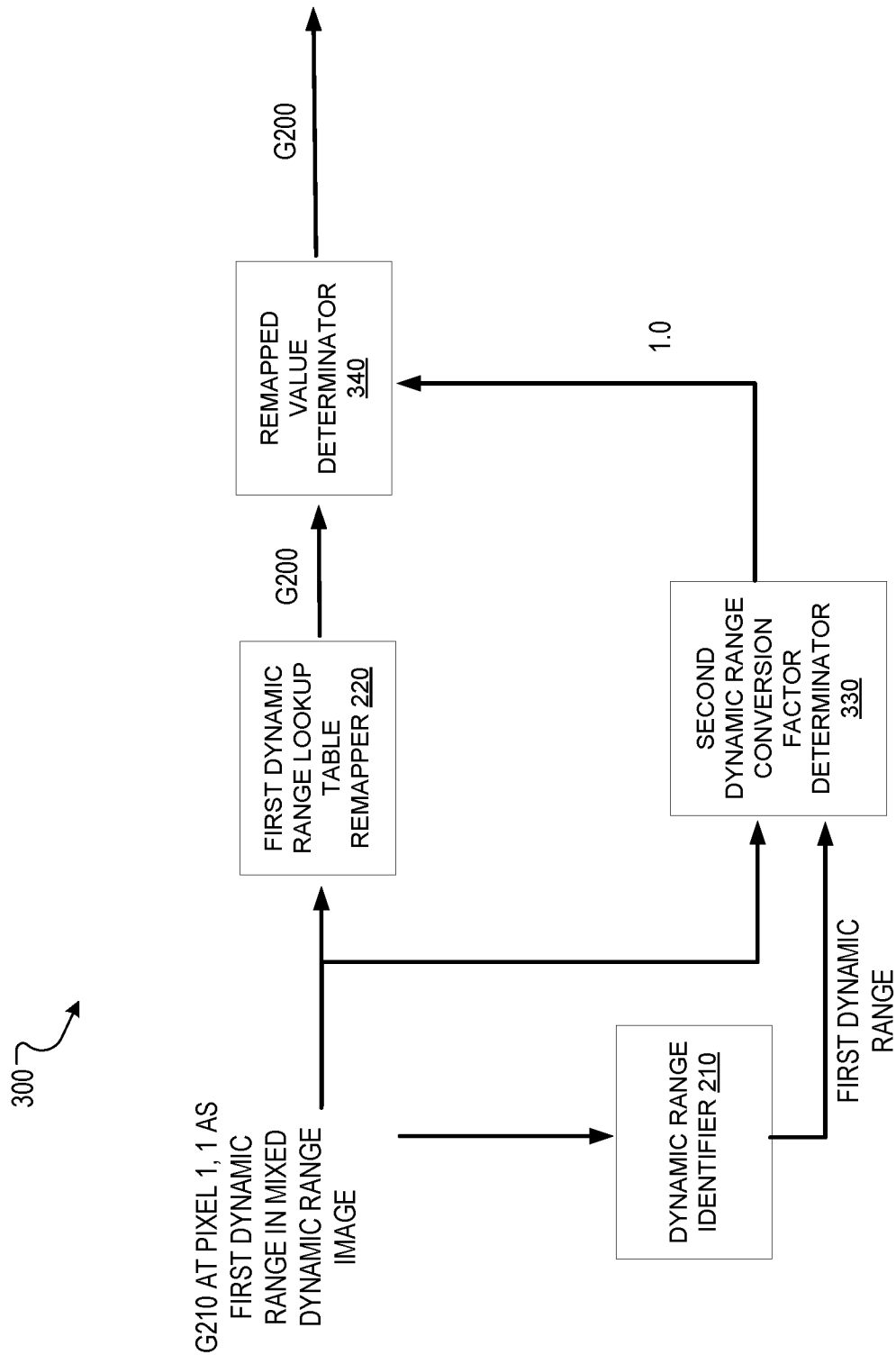

FIGS. 3A-3C are block diagrams of an example system 300 that remaps mixed dynamic range with a dynamic range conversion factor applied to an output from a lookup table. The system 200 may have a disadvantage in that the different lookup tables may both need to be calibrated in production line which may take time and increase the cost. Additionally, including different lookup tables may increase hardware size requirements needed to store the different lookup tables. The system 300 may enable only a single lookup table be stored, which may reduce a number of lookup tables that need to be calibrated and reduce hardware size requirements compared to the system 200.

The system 300 includes the dynamic range identifier 210, the first dynamic range lookup table remapper 220, a second dynamic range conversion factor determinator 330, and a remapped value determinator 340. The dynamic range identifier 210 and the first dynamic range lookup table remapper 220 may operate similarly to as described for system 200.

The second dynamic range conversion factor determinator 330 may receive a dynamic range indicator and determine a second dynamic range conversion factor based on the dynamic range indicator. For example, the second dynamic range conversion factor determinator 330 may receive an indication that a pixel at 1, 1 includes first dynamic range content from the dynamic range identifier 210 and, in response, determine a second dynamic range conversion factor of 1.0. In another example, the second dynamic range conversion factor determinator 330 may receive an indication that a pixel at 10, 10 includes second dynamic range content from the dynamic range identifier 210 and, in response, determine a second dynamic range conversion factor of 0.9.

In some implementations, second dynamic range conversion factor determinator 330 may determine the second dynamic range conversion factor to be 1.0 when content is indicated to be the first dynamic range. For example, the second dynamic range conversion factor determinator 330 may receive an indication that a pixel at 1, 1 includes first dynamic range content from the dynamic range identifier 210 and, in response, determine a second dynamic range conversion factor of 1.0.

In some implementations, second dynamic range conversion factor determinator 330 may determine the second dynamic range conversion factor based on an equation of:

$$F(x_d) = (x_d/255)^\gamma \cdot G_{HDR}(x_d) \cdot L_{max} \qquad \text{(Equation 1)}$$

Where $F(x_d)$ represents the second dynamic range conversion factor, $x_d$ represents the initial value as input, $G_{HDR}$ represents the HDR gamma curve which corresponds to the HDR lookup table, and $L_{max}$ represents the maximum luminance. $L_{max}$ may be determined based on whether the image includes only second dynamic range content or includes mixed dynamic range content. For example, $L_{max}$ may be five hundred when the image includes only second dynamic range content and may be two hundred fifty when the image includes mixed dynamic range content.

The remapped value determinator 340 may receive a first intermediate remapped value from the first dynamic range lookup table remapper and the second dynamic range conversion factor from the second dynamic range conversion factor determinator 330, and provide a remapped value based on the first intermediate remapped value and the second dynamic range conversion factor.

As shown in FIG. 3B for a pixel at 10, 10 with a value of G210 for second dynamic range content, the dynamic range identifier 210 may output an indication second dynamic range, the second dynamic range conversion factor determinator 330 may receive the indication of second dynamic range and the value of G210 and determine a second dynamic range conversion factor of 0.9, the first dynamic range lookup table remapper 220 may output a first intermediate remapped value of G200, and the remapped value determinator may receive a first intermediate remapped value of G200 and a conversion factor of 0.9, and in response, provide a remapped value of G180 based on multiplying the first intermediate remapped value of G200 by the conversion factor of 0.9.

As shown in FIG. 3C for a pixel at 1, 1 with a value of G210 for first dynamic range content, the dynamic range identifier 210 may output an indication first dynamic range, the second dynamic range conversion factor determinator 330 may receive the indication of second dynamic range and the value of G210 and determine a second dynamic range conversion factor of 1.0, the first dynamic range lookup table remapper 220 may output a first intermediate remapped value of G200, and the remapped value determinator may receive a first intermediate remapped value of G200 and a conversion factor of 1.0, and in response, provide a remapped value of G200 based on multiplying the first intermediate remapped value of G200 by the conversion factor of 1.0.

Figure 4A:
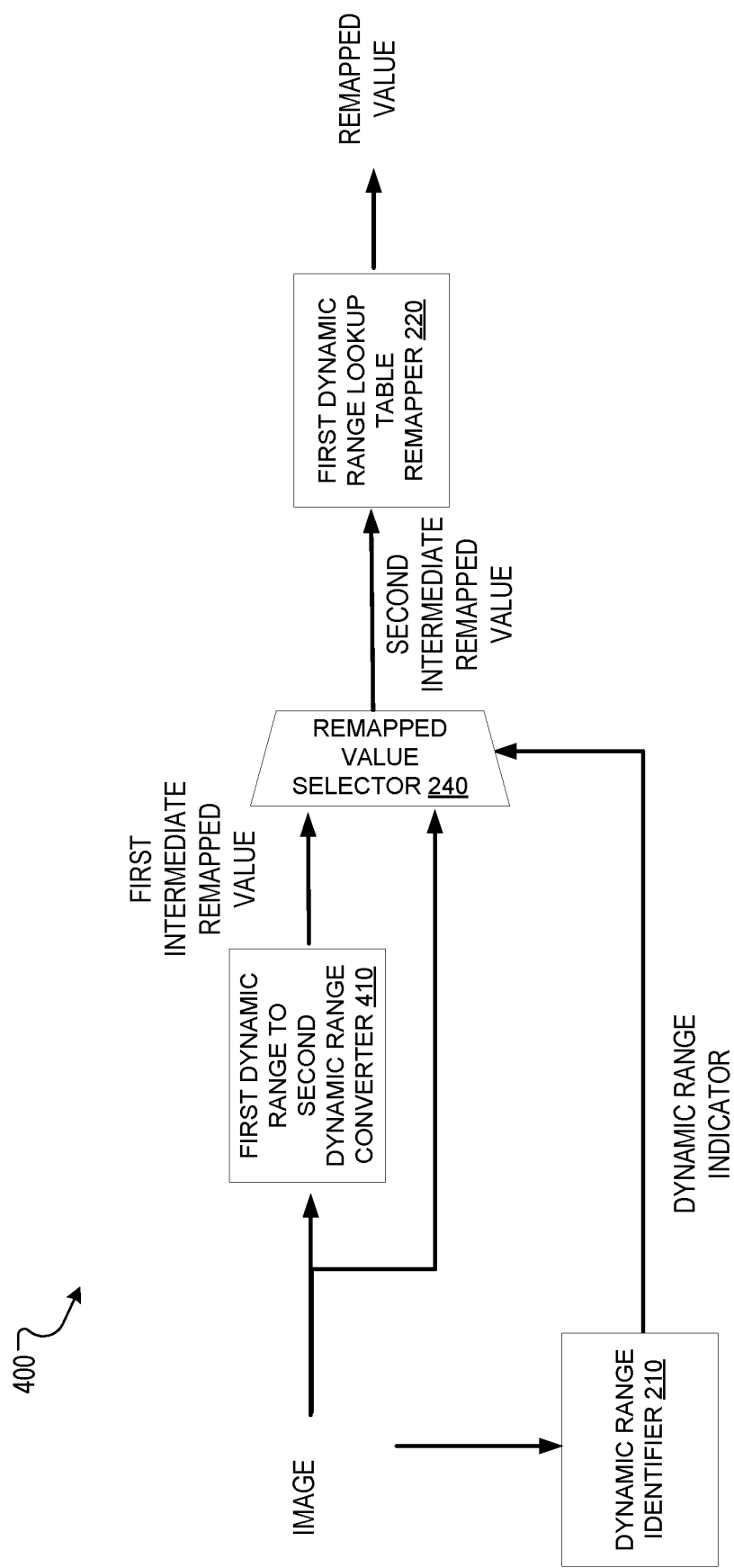
FIGS. 4A-4C are block diagrams of an example system that remaps mixed dynamic range using a dynamic range converter as part of input for a lookup table.
Figure 4B:
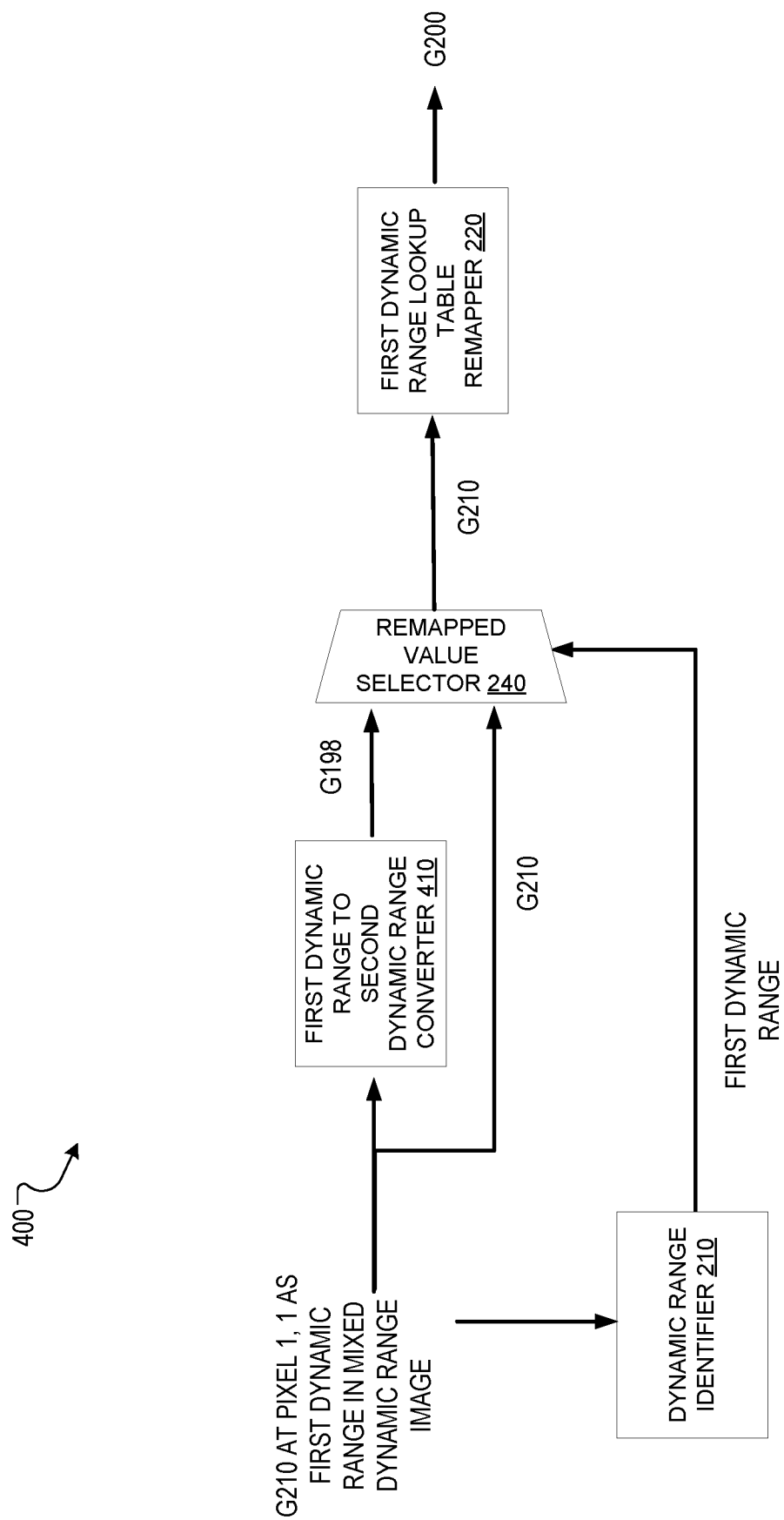
Figure 4C:
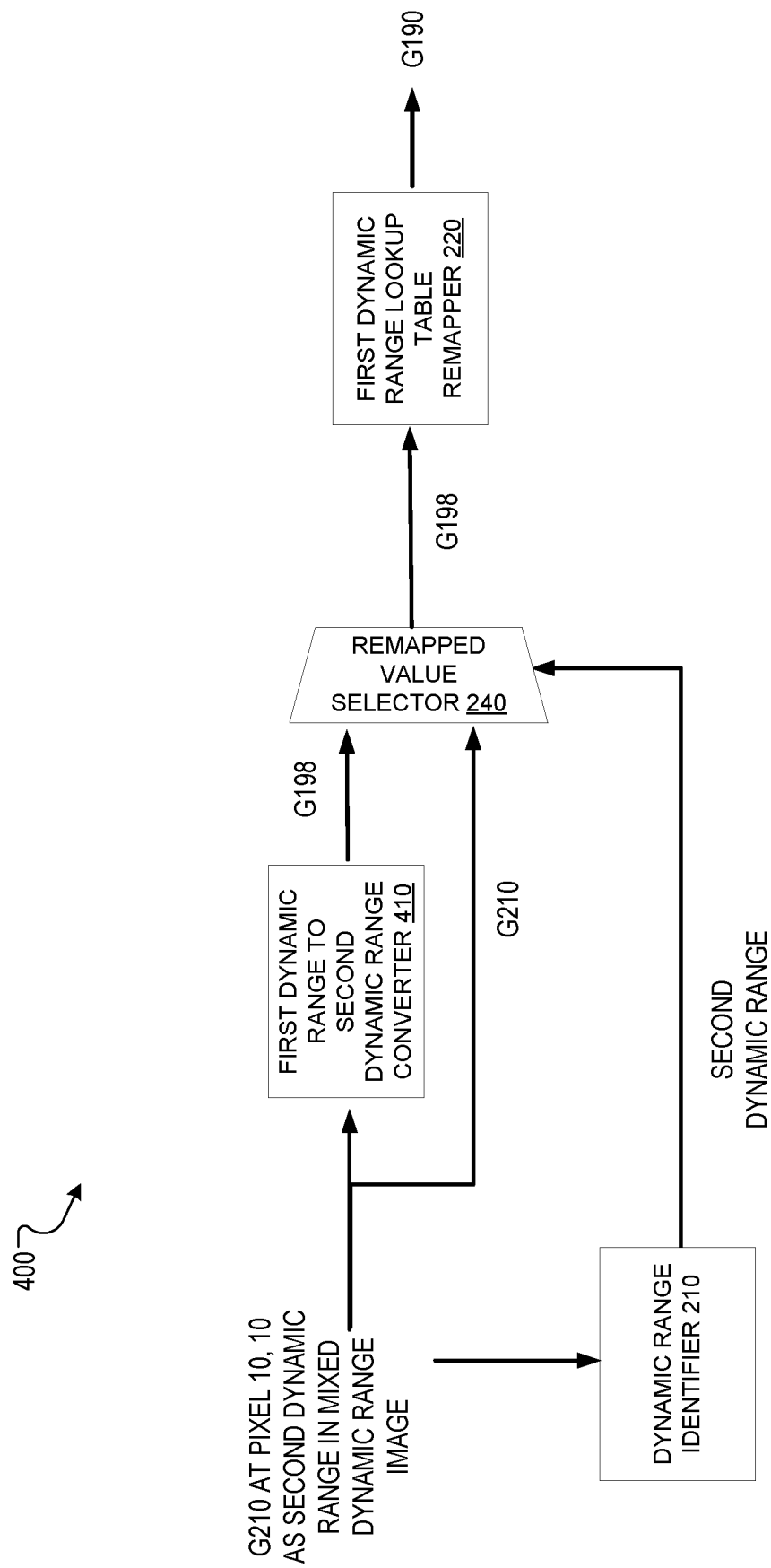

In some implementations, the first intermediate remapped value may be represented by ten bits, the conversion factor may be represented by ten bits, and the remapped value may be represented by eleven bits. Accordingly, the system 200 may not include much loss in data represented by values FIGS. 4A-4C are block diagrams of an example system 400 that remaps mixed dynamic range using a dynamic range converter 410 as part of input for a lookup table. The system 300 includes the dynamic range identifier 210, the first dynamic range to second dynamic range converter 410, a remapped value selector 240, and the first dynamic range lookup table remapper 220.

The first dynamic range to second dynamic range converter 410 may receive an input value and output a first intermediate remapped value based on the input value. For example, the converter 410 may receive an input of G210 and output G198. In another example, the converter 410 may receive an input of G205 and output G193.

As shown in FIG. 4B for a pixel at 1, 1 with a value of G210 for first dynamic range content, the dynamic range identifier 210 may receive the image and output an indication of first dynamic range, the converter 410 may receive an input of G210 from the image and output G198, the remapped value selector 240 may receive the indication of first dynamic range from the dynamic range identifier 210, G210 from the image, and G198 as the first intermediate remapped value from the converter 410, and select the G210 from the image as the remapped value.

As shown in FIG. 4C for a pixel at 10, 10 with a value of G210 for second dynamic range content, the dynamic range identifier 210 may receive the image and output an indication of second dynamic range, the converter 410 may receive an input of G210 from the image and output G198, the remapped value selector 240 may receive the indication of first dynamic range from the dynamic range identifier 210, G210 from the image, and G198 as the first intermediate remapped value from the converter 410, and select the G198 from the image as the remapped value.

In some implementations, the first dynamic range to second dynamic range converter 410 may receive and output eight bit values. Accordingly, in some implementations, truncation error may reduce accuracy of display of content in the second dynamic range. In some implementations, the identifier 210, the converter 410, and the selector 240 may be included in a system on chip before a driver integrated chip that includes the remapper 220.

Figure 5:
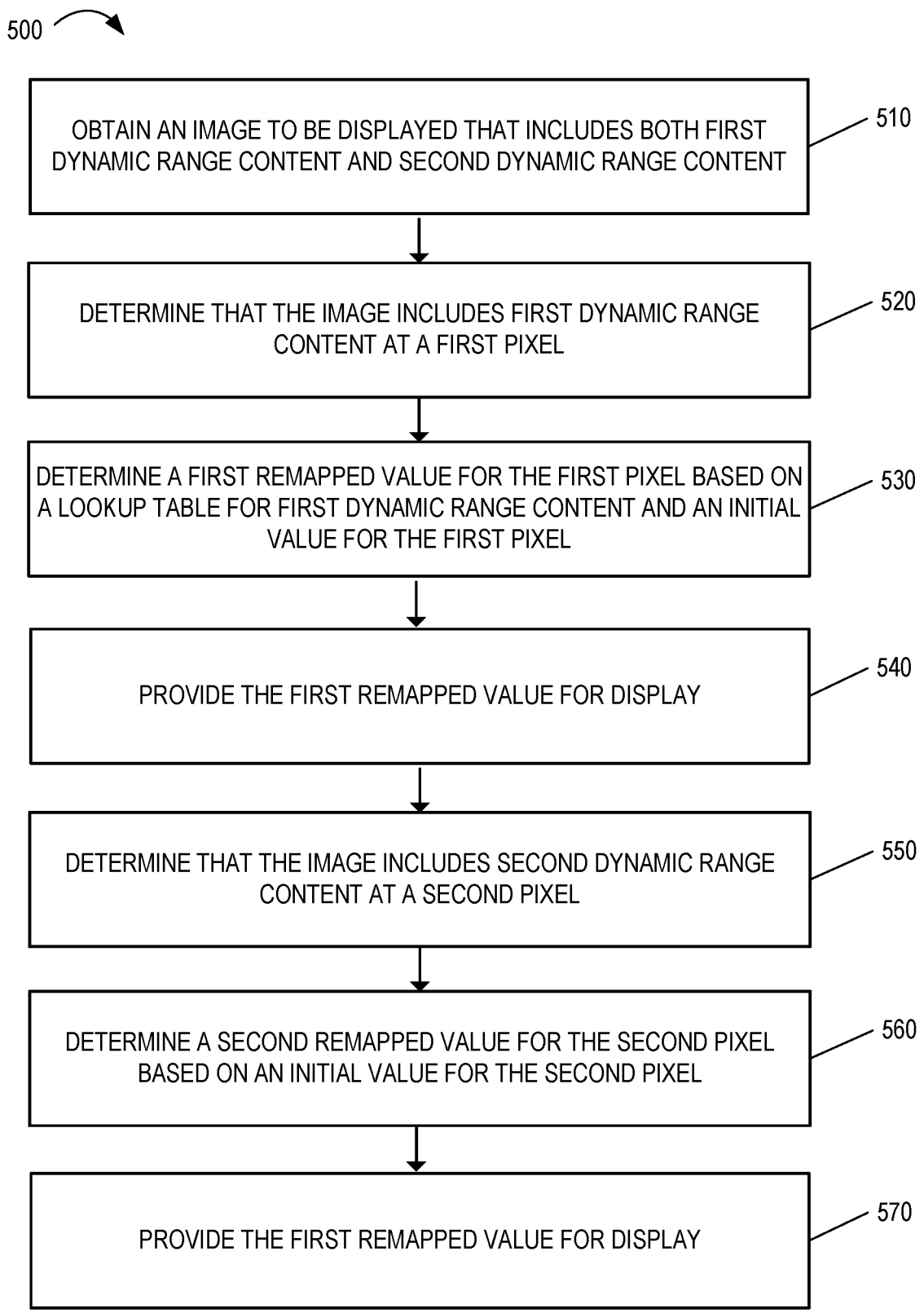
FIG. 5 is a flowchart that shows a process for remapping for mixed dynamic range content.

FIG. 5 is a flowchart that shows a process 500 for remapping for mixed dynamic range content. The process 500 may be performed by the systems 200, 300, or 400. The process 500 includes obtaining an image to be displayed that includes both first dynamic range content and second dynamic range content (510). For example, the dynamic range identifier 210 may receive an image that includes G210 at a pixel at a location of 1, 1 as first dynamic range and G210 at a pixel at a location of 10, 10 as second dynamic range.

The process 500 includes determining that the image includes first dynamic range content at a first pixel (520). In some implementations, determining that the image includes first dynamic range content at a first pixel includes determining that metadata of the image indicates that a location of the first pixel includes first dynamic range content. For example, the dynamic range identifier 210 may determine that metadata stored in a header of an image file specifies that a pixel at a location of 1, 1 includes first dynamic range content and, in response, determine that the pixel at location of 1, 1 includes first dynamic range content. In another example, the dynamic range identifier 210 may determine that metadata stored in a header of an image file specifies that a pixel at a location of 10, 10 includes second dynamic range content and, in response, determine that the pixel at location of 10, 10 includes second dynamic range content.

The process 500 includes determining a first remapped value for the first pixel based on a lookup table for first dynamic range content and an initial value for the first pixel (530). For example, the first dynamic range lookup table remapper 220 may receive an initial value of G210 and output a first remapped value of G200.

In some implementations, determining a first remapped value for the first pixel based on a lookup table for first dynamic range content and an initial value for the first pixel includes determining a remapped value for the first pixel based on a lookup table for first dynamic range content. For example, the remapper 220 may obtain a lookup table for HDR content, identify the single entry in the lookup table with a value of G210 as an input value, and then select a corresponding paired value of G200 in the single entry as the first remapped value. In another example, the remapper 220 may obtain a lookup table for HDR content, identify the single entry in the lookup table with a value of G205 as an input value, and then select a corresponding paired value of G195 in the single entry as the first remapped value.

The process includes providing the first remapped value for the first pixel for display (540). For example, as shown in FIG. 2B, the remapped value selector 240 may provide the first intermediate remapped value of G200 as the remapped value. In another example, as shown in FIG. 3C, the remapped value determinator 340 may multiply the first intermediate remapped value of G200 with a factor of 1.0 so provide the first intermediate remapped value of G200 as the remapped value. In yet another example, as shown in FIG. 4B, the remapper 220 may provide the first remapped value of G200 for display.

The process includes determining that the image includes second dynamic range content at a second pixel (550). For example, the dynamic range identifier 210 may determine that metadata stored in a header of an image file specifies that a pixel at a location of 10, 10 includes second dynamic range content and, in response, determine that the pixel at location of 10, 10 includes second dynamic range content.

The process 500 includes determining a second remapped value for the second pixel based on a second initial value for the second pixel (560). In some implementations, determining a second remapped value for the second pixel based on a second initial value for the second pixel includes determining a second remapped value for the second pixel based on a lookup table for second dynamic range content. For example, as shown in FIG. 2B, the second dynamic range lookup table remapper 230 may determine a second remapped value of G180 based on a second initial value of G210.

In some implementations, determining a second remapped value for the second pixel based on a second initial value for the second pixel includes determining a second remapped value for the second pixel based on both the lookup table for the first dynamic range content and a first dynamic range to second dynamic range conversion factor. In some implementations, determining a second remapped value for the second pixel based on both the lookup table for the first dynamic range content and a first dynamic range to second dynamic range conversion factor includes determining an intermediate remapped value for the second pixel based on the lookup table for the first dynamic range content and determining the second remapped value based on the intermediate remapped value and the first dynamic range to second dynamic range conversion factor. For example, as shown in FIG. 3B, the remapped value determinator 340 may receive a first intermediate remapped value of G200 from the first dynamic range lookup table remapper 220 and multiply the value of G200 by a received conversion factor of 0.9 to arrive at a second remapped value of G180.

In some implementations, determining a second remapped value for the second pixel based on a second initial value for the second pixel includes determining an intermediate remapped value for the second pixel based on a first dynamic range to second dynamic range conversion and determining the second remapped value based on the intermediate remapped value and the lookup table for the first dynamic range content. For example, as shown in FIG. 4C, the converter 410 may receive a second initial value of G210 and convert the value of G210 to G198, the remapped value selector 240 may then select the value of G198 from the converter 410, and the remapper 220 may then remap the value of G198 from the selector 240 to G190.

The process 500 includes providing the second remapped value for the second pixel for display (570). For example, as shown in FIG. 2C, the output of the selector 240 may be used as the second remapped value. In another example, as shown in FIG. 3B, the output of the remapped value determinator 340 may be used as the second remapped value. In yet another example, as shown in FIG. 3C, the output of the remapper 220 may be used as the second remapped value.

In some implementations, the process 500 includes obtaining a second image that includes second dynamic range content and does not include first dynamic range content, determining that the image includes second dynamic range content and does not include first dynamic range content, and in response to determining that the image includes second dynamic range content and does not include first dynamic range content, selecting a second first dynamic range to second dynamic range conversion factor. For example, the dynamic range identifier 210 may determine that an image only includes second dynamic range content and, in response, provide an indication to the conversion factor determinator 330 to increase a conversion factor.

In some implementations, the first dynamic range content includes High Dynamic Range (HDR) content and the second dynamic range content includes Standard Dynamic Range (SDR) content.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus.

A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., a FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM (erasable programmable read-only memory), EEPROM (electrically erasable programmable read-only memory), and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube), LCD (liquid crystal display) or OLED (organic light emitting diode) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a user computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some embodiments, a server transmits data (e.g., an HTML page) to a user device (e.g., for purposes of displaying data to and receiving user input from a user interacting with the user device). Data generated at the user device (e.g., a result of the user interaction) can be received from the user device at the server.

While this specification contains many specific implementation details, these should not be construed as limitations on the scope of any features or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method comprising:
   obtaining an image to be displayed that includes both first dynamic range content and second dynamic range content;
   determining a first remapped value for a first pixel based on a lookup table for first dynamic range content and an initial value for the first pixel;

determining a second remapped value for the first pixel based on a lookup table for second dynamic range content and the initial value for the first pixel;
determining that the image includes first dynamic range content at the first pixel;
in response to determining that the image includes first dynamic range content at the first pixel, selecting the first remapped value for the first pixel from among the first remapped value for the first pixel and the second remapped value for the first pixel;
providing the first remapped value for the first pixel for display;
determining a first remapped value for a second pixel based on the lookup table for first dynamic range content and an initial value for the second pixel;
determining a second remapped value for the second pixel based on the lookup table for second dynamic range content and the initial value for the second pixel;
determining that the image includes second dynamic range content at the second pixel;
in response to determining that the image includes second dynamic range content at the second pixel, selecting the second remapped value for the second pixel from among the first remapped value for the second pixel and the second remapped value for the second pixel; and
providing the second remapped value for the second pixel for display.

2. The method of claim 1, wherein determining that the image includes first dynamic range content at the first pixel comprises:
determining that metadata of the image indicates that a location of the first pixel includes first dynamic range content.

3. The method of claim 1, comprising:
obtaining a second image that includes second dynamic range content and does not include first dynamic range content;
determining that the image includes second dynamic range content and does not include first dynamic range content; and
in response to determining that the image includes second dynamic range content and does not include first dynamic range content, selecting a second first dynamic range to second dynamic range conversion factor.

4. The method of claim 1, wherein the first dynamic range content comprises High Dynamic Range (HDR) content and the second dynamic range content comprises Standard Dynamic Range (SDR) content.

5. A method comprising:
obtaining an image to be displayed that includes both first dynamic range content and second dynamic range content;
determining an intermediate remapped value for a first pixel based on a lookup table for first dynamic range content and an initial value for the first pixel;
determining that the image includes first dynamic range content at the first pixel;
in response to determining that the image includes first dynamic range content at the first pixel, determining to use the intermediate remapped value for the first pixel as a first remapped value for the first pixel;
providing the first remapped value for the first pixel for display;

determining an intermediate remapped value for a second pixel based on a lookup table for first dynamic range content an initial value for the second pixel;
determining that the image includes second dynamic range content at the second pixel;
in response to determining that the image includes second dynamic range content at the second pixel, determining a second remapped value for the second pixel based on the intermediate remapped value and a first dynamic range to second dynamic range conversion factor; and
providing the second remapped value for the second pixel for display.

6. A method comprising:
obtaining an image to be displayed that includes both first dynamic range content and second dynamic range content;
determining that the image includes first dynamic range content at a first pixel;
in response to determining that the image includes first dynamic range content at the first pixel, determining a first remapped value for the first pixel based on a lookup table for first dynamic range content and an initial value for the first pixel;
providing the first remapped value for the first pixel for display;
determining an intermediate remapped value for a second pixel based on a first dynamic range to second dynamic range conversion;
determining that the image includes second dynamic range content at the second pixel;
in response to determining that the image includes second dynamic range content at the second pixel, determining a second remapped value for the second pixel based on the intermediate remapped value for the second pixel and the lookup table for the first dynamic range content; and
providing the second remapped value for the second pixel for display.

7. A system that includes circuitry configured to perform operations of:
obtaining an image to be displayed that includes both first dynamic range content and second dynamic range content;
determining a first remapped value for a first pixel based on a lookup table for first dynamic range content and an initial value for the first pixel;
determining a second remapped value for the first pixel based on a lookup table for second dynamic range content and the initial value for the first pixel;
determining that the image includes first dynamic range content at the first pixel;
in response to determining that the image includes first dynamic range content at the first pixel, selecting the first remapped value for the first pixel from among the first remapped value for the first pixel and the second remapped value for the first pixel;
providing the first remapped value for the first pixel for display;
determining a first remapped value for a second pixel based on the lookup table for first dynamic range content and an initial value for the second pixel;
determining a second remapped value for the second pixel based on the lookup table for second dynamic range content and the initial value for the second pixel;
determining that the image includes second dynamic range content at the second pixel;

in response to determining that the image includes second dynamic range content at the second pixel, selecting the second remapped value for the second pixel from among the first remapped value for the second pixel and the second remapped value for the second pixel; and providing the second remapped value for the second pixel for display.

8. The system of claim 7, wherein determining that the image includes first dynamic range content at the first pixel comprises:
determining that metadata of the image indicates that a location of the first pixel includes first dynamic range content.

9. The system of claim 7, the operations comprising:
obtaining a second image that includes second dynamic range content and does not include first dynamic range content;
determining that the image includes second dynamic range content and does not include first dynamic range content; and
in response to determining that the image includes second dynamic range content and does not include first dynamic range content, selecting a second first dynamic range to second dynamic range conversion factor.

10. The system of claim 7, wherein the first dynamic range content comprises High Dynamic Range (HDR) content and the second dynamic range content comprises Standard Dynamic Range (SDR) content.

11. A system that includes circuitry configured to perform operations of:
obtaining an image to be displayed that includes both first dynamic range content and second dynamic range content;
determining an intermediate remapped value for a first pixel based on a lookup table for first dynamic range content and an initial value for the first pixel;
determining that the image includes first dynamic range content at the first pixel;
in response to determining that the image includes first dynamic range content at the first pixel, determining to use the intermediate remapped value for the first pixel as a first remapped value for the first pixel;
providing the first remapped value for the first pixel for display;
determining an intermediate remapped value for a second pixel based on a lookup table for first dynamic range content an initial value for the second pixel;
determining that the image includes second dynamic range content at the second pixel;
in response to determining that the image includes second dynamic range content at the second pixel, determining a second remapped value for the second pixel based on the intermediate remapped value a second initial value for the second pixel, wherein determining the second remapped value for the second pixel based on the second initial value for the second pixel comprises determining the second remapped value for the second pixel based on both the lookup table for the first dynamic range content and a first dynamic range to second dynamic range conversion factor; and
providing the second remapped value for the second pixel for display.

12. A system that includes circuitry configured to perform operations of:
obtaining an image to be displayed that includes both first dynamic range content and second dynamic range content;
determining that the image includes first dynamic range content at a first pixel;
in response to determining that the image includes first dynamic range content at the first pixel, determining a first remapped value for the first pixel based on a lookup table for first dynamic range content and an initial value for the first pixel;
providing the first remapped value for the first pixel for display;
determining an intermediate remapped value for a second pixel based on a first dynamic range to second dynamic range conversion;
determining that the image includes second dynamic range content at the second pixel;
in response to determining that the image includes second dynamic range content at the second pixel, determining a second remapped value for the second pixel based on the intermediate remapped value for the second pixel and the lookup table for the first dynamic range content; and
providing the second remapped value for the second pixel for display.

* * * * *